United States Patent Office 3,179,291
Patented Apr. 20, 1965

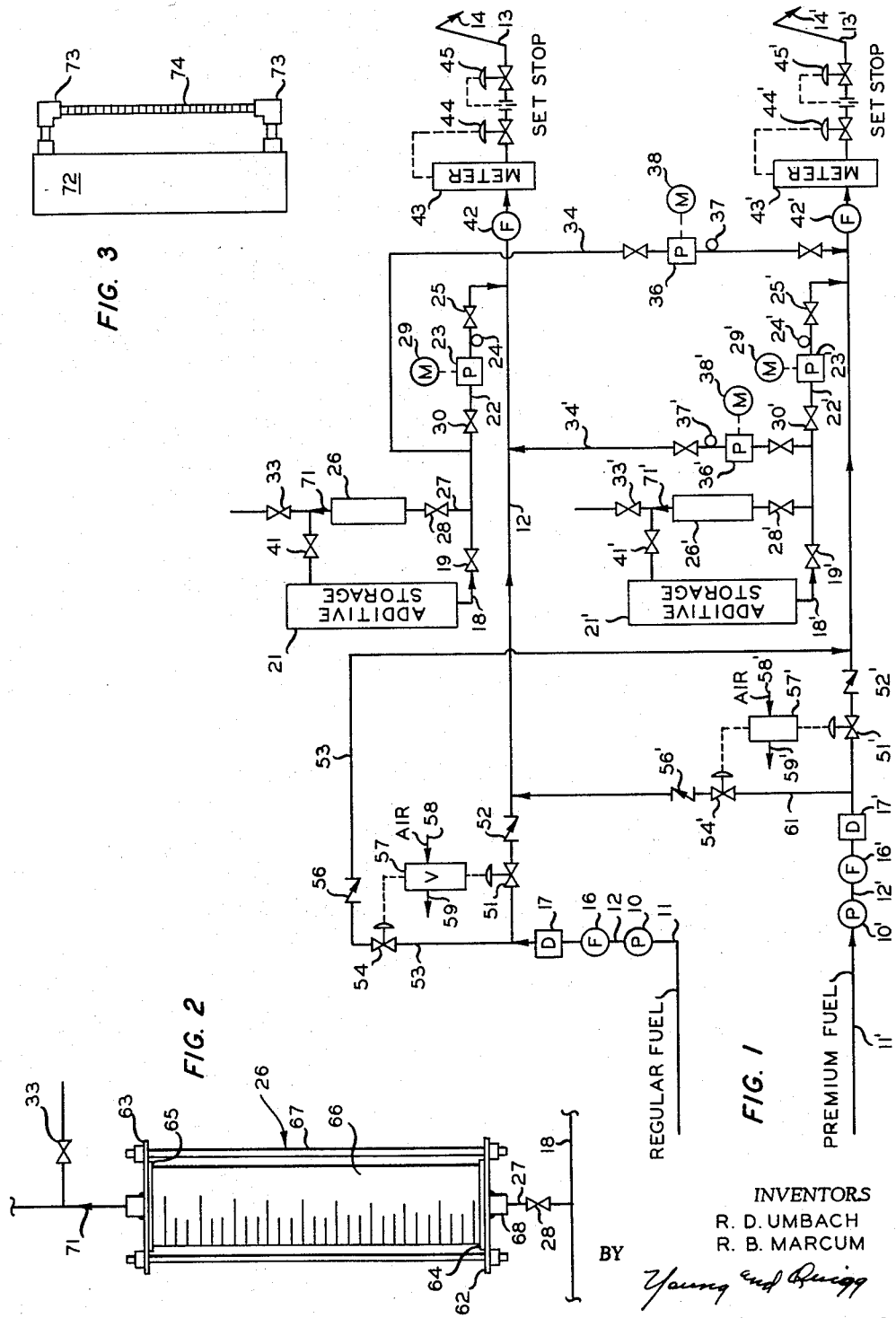

3,179,291
BLENDING AND DISPENSING SYSTEM HAVING CALIBRATION MEANS FOR ADDITIVE PUMPS
Roy D. Umbach, Okmulgee, Okla., and Roy B. Marcum, Borger, Tex., assignors to Phillips Petroleum Company, a corporation of Delaware
Filed Dec. 7, 1962, Ser. No. 242,990
4 Claims. (Cl. 222—20)

This invention relates to a blending and dispensing system. In one aspect this invention relates to apparatus for calibrating and/or checking a dispensing pump while said pump is in operation. In another aspect this invention relates to a method for calibrating and/or checking a dispensing pump while said pump is in operation.

In present-day processing operations many different methods and apparatus for blending and dispensing blended liquids and fluids have been developed. Some of these methods involve batch blending techniques comprising pumping a second liquid into a first liquid in a mixing vessel wherein the liquids are mixed. The resultant blend is then pumped to a storage tank from which it is dispensed into a transport container, or in some instances is dispensed directly from said mixing tank after the blend is completed. In such batch processes the components of the blend can be precisely controlled. However, where possible, it is desirable to perform the blending operations continuously and pump the resultant blend directly to the transport container. Such continuous methods possess obvious advantages in the saving of time, manpower, storage space, etc.

In continuous blending and dispensing processes the components of the blend must be precisely controlled because the resultant blend is loaded directly into the transport container. Unloading of an off-specification blend from a transport container entails obvious disadvantages. Precise control of the components of the blend is essential, and is particularly important where the quantity of one of the components in the blend is small. The most common method for carrying out such blending operations comprises the use of so-called proportioning pumps. Such pumps are usually positive displacement pumps which, in theory, can be adjusted for accurate delivery rates. However, in actual practice the delivery rates of such pumps are affected by back pressure on the discharge of the pump, the condition of the check valves in the pump, and other factors. Thus, it is necessary to frequently calibrate and/or check the delivery rate of such pumps. A commonly used method for calibrating or checking such a pump is to measure the discharge rate by withdrawing a sample from the pump discharge conduit and measuring the amount of liquid pumped per a given unit of time. Obviously, such a method cannot be used during continuous blending operations, i.e., when the pump is actually pumping one liquid into a conduit containing another fluid with which it is to be blended, because withdrawing the sample from the discharge conduit of the pump will upset the blending operation. This means that the pump must be calibrated or checked with an open discharge conduit. When the pump is then placed in operation and operated against a back pressure as in normal operations, the back pressure will affect the discharge rate and/or the operation of the check valves in the pump and the previously obtained calibration using an open discharge conduit is erroneous. It is extremely difficult, if not impossible, to simulate actual operating conditions such as back pressure on the pump discharge, etc.

The present invention provides an apparatus and method for overcoming the above-described difficulties. We have found that a positive displacement pump can be accurately calbrated and/or checked for discharge rate by measuring the suction rate of said pump while it is in actual operation. Thus, in a broad aspect, the present invention resides in combinations of dispensing apparatus comprising a calibrating gauge operatively connected into the suction conduit of a dispensing pump, and methods of calibrating a dispensing pump comprising measuring the suction rate of said pump while said pump is operating under regular operating conditions.

An object of this invention is to provide improved fluid dispensing systems. Another object of this invention is to provide an improved fluid dispensing apparatus combination comprising a pump calibration gauge disposed in the suction conduit of a dispensing pump. Another object of this invention is to provide an apparatus for calibrating a dispensing pump while said pump is in normal operation. Another object of this invention is to provide a method for calibrating a dispensing pump while said pump is in normal operation. Still another object of this invention is to provide an improved apparatus and an improved method for continuously blending two or more liquids together. Other aspects, objects, and advantages of the invention will be apparent to those skilled in the art in view of this disclosure.

Thus, according to the invention, in a fluid dispensing apparatus comprising a main flow conduit through which a first fluid flows, a blend liquid conduit extending from a source of blend liquid supply into connection with said main flow conduit, and a pump disposed in said blend liquid conduit, there is provided the improvement comprising: a pump calibrating gauge connected into said blend liquid conduit upstream of said pump and downstream from said source of said blend liquid; a first valve in said blend liquid conduit upstream of said pump calibration gauge for isolating said source of blend liquid from said blend liquid conduit; and a second valve for isolating said pump calibration gauge from said blend liquid conduit.

Still further according to the invention, in a continuous blending method wherein a first fluid is flowed through a main conduit, a blend liquid is pumped through a second conduit into said main conduit and blended with said first fluid, and the amount of said blend liquid blended with said first fluid is determined from calibration of the pump which pumps said blend liquid by previously measuring the discharge rate of said pump, the improved method comprising: calibrating said pump during actual continuous blending operations by measuring the suction rate of said pump.

Still further according to the invention, there is provided a pump calibrating gauge comprising: first and second spaced apart plates, each provided with an opening therein; a first and a second annular gasket disposed adjacent said first and second plates, respectively, around said openings therein; a calibrated cylinder disposed between said first and second gaskets, the ends of said cylinder enclosing said openings in said plates; a plurality of adjustable rods connecting said plates for bringing said gaskets into sealing engagement with said ends of said cylinder; means provided on said first plate for connecting a conduit means thereto in communication with said openig in said first plate; and a vent conduit connected to said second plate in communication with said opening therein.

It is to be noted that the invention provides an apparatus and method for calibrating a pump, while said pump is in actual operation in a fluid dispensing and blending system, by measuring the suction rate of said pump. In this manner all the variables which affect the discharge rate of the pump, e.g., back pressure on the pump discharge conduit, the condition of the check valves in the pump, etc., are eliminated.

The invention finds ready application in any dispensing and blending system wherein a second liquid is continuously blended into a first liquid or other fluid by means of a pump such as a proportioning pump. The invention finds particular advantageous application where the quantity of said second liquid is very small compared to the quantity of the first liquid. For example, Military Specification MIL-J-5624F requires the addition of an anti-icing additive composed of 12.7±1.0 weight percent of glycerol and 87.3±1.0 weight percent ethylene glycol monomethyl ether to jet fuels in amounts of from 0.10 to 0.15 percent by volume, based on said fuel. Many additives are added to fuels in even smaller amounts. For example, several oil companies add various additive agents such as anti-stall agents to their gasoline in amounts such as from 0.025 to 0.075 liquid volume percent based on the gasoline, depending upon the additive used and the season. Additives which can be so used include various glycol ethers such as methyl carbitol, and alcohols such as isopropanol. The problems connected with accurately blending such small amounts of additives on a continuous basis will be appreciated by those skilled in the art. The present invention has completely eliminated these problems.

FIGURE 1 is a diagrammatic flow sheet illustrating schematically several combinations of apparatus for continuously blending and dispensing liquids or other fluids in accordance with the invention.

FIGURE 2 is a diagrammatic illustration in elevation of a pump calibration gauge in accordance with the invention.

FIGURE 3 is a diagrammatic illustration in elevation of a cylinder which can be employed in the gauge of FIGURE 2.

Referring now to said drawings wherein like numerals have been employed to designate like elements of apparatus, the invention will be more fully explained. It is to be understood that said drawings are diagrammatic in nature. Many valves, pressure gauges, relays, motors, switches, etc. not necessary for explaining the invention to those skilled in the art have been omitted so as to simplify said drawings. All of the individul elements shown in said drawings are commercially available conventional equipment with the exception of the pump calibration gauge illustrated in FIGURES 2 and 3. The present invention resides in the combinations and arrangements of said elements to obtain the improved results as described herein.

In FIGURE 1 there are illustrated several combinations of blending and dispensing apparatus in accordance with the invention. Starting in the upper portion of FIGURE 1 with the conduit designated "Regular Fuel" (e.g., gasoline) there is shown a pump 10 connected to a source of fuel supply (not shown) by means of conduit 11. A main fuel flow conduit 12 is connected at one end to the discharge of said pump and at the other end to a dispensing conduit 13. In some embodiments of the invention, said dispensing conduit is provided with a discharge nozzle 14 which can include a valve if desired. It is desirable, but not essential, to include in said main flow conduit a filter 16 and a deaerator 17 as shown. An additive conduit 18, having a valve 19 therein, is connected at one end to additive storage tank 21. A first secondary additive conduit 22 is connected at one end to said main additive conduit 18 at a point downstream from said valve 19 and is connected at its other end to main flow conduit 12. A first additive pump 23 operatively connected to motor 29 is disposed in said secondary additive conduit 22. A sight flow gauge 24 is disposed in said secondary additive conduit 22 between said pump 23 and main flow conduit 12. Said sight flow gauge 24 provides a visual check for ready determination of whether or not said pump is actually pumping liquid. A pump calibration gauge 26, mounted at an elevation lower than said additive storage tank 21, is connected into main additive conduit 18 by means of conduit 27 having valve 28 therein. Said valve 28 and said valve 19 are preferably quick action valves in order that they can be rapidly opened and closed as described hereinafter.

A second secondary additive conduit 34 is connected at one end to said main additive conduit 18 and at its other end to a second main flow conduit 12′, discussed further hereinafter. A second additive pump 36 operatively connected to motor 38 is disposed in said secondary blending conduit 34. A sight flow gauge 37 is disposed in said secondary additive conduit 34 between said pump 36 and said second main flow conduit 12′.

A second filter 42 is preferably disposed in main flow conduit 12 downstream from the point of connection of secondary blending conduits 22 and 34′. A set stop meter 43 is disposed in main flow conduit 12 downstream of filter 42. Said meter 43 can be any of the several suitable types of such meters which are available commercially. One such meter is a Model AB-60 manufactured by the A. O. Smith Corporation and described in their Bulletin 125-C and Supplementary Bulletin 125: AB-50. A set stop valve 44 is positioned in main flow conduit 12 downstream from said meter 43 and is operatively connected to said meter 43 so that when said meter registers a predetermined set amount said set stop valve 44 is automatically closed. A maximum flow valve 45, operated by means of differential pressure across the orifice indicated, is disposed in said main flow conduit 12 downstream from said set stop valve 44 and is provided for the purpose of protecting said meter against too great a flow.

The operation of said meter 43 and said set stop valve 44 is conventional. As indicated, said set stop valve 44 is a pneumatically operated motor valve and when said meter 43 registers a predetermined quantity of pumped liquid it automatically supplies instrument air, from a source not shown, to the motor of said valve 44 causing same to close.

Thus, in one broad aspect of the invention, one combination of dispensing and blending apparatus can comprise said main flow conduit 12 connected at one end to a source of liquid supply and at the other end to dispensing conduit 13. A blend liquid or additive conduit, in this embodiment comprising conduits 18 and 22, is connected at one end to a source of blend liquid supply (additive storage 21) and at its other end to said main flow conduit 12 intermediate the ends thereof. Valve 19 is disposed in said blend liquid conduit downstream from additive storage 21, and blend liquid pump 23 is disposed in said blend liquid conduit downstream from said valve 19. Pump calibrating gauge 26 is connected into said blend liquid conduit between said valve 19 and said pump 23. While desirable for most efficient operation in accordance with the invention, the elements filter 42, meter 43, set stop valve 44, maximum flow valve 45, and timer 41 are not essential because the operations can be manually controlled if desired.

Referring now to the lower portion of FIGURE 1, the elements therein which are like the elements in the upper portion of FIGURE 1 are given the same reference numerals with a prime mark. For example, the second main flow conduit which is designated "Premium Fuel" (e.g., gasoline) is given the reference numeral 12′. Thus, it will be understood that the description herein for the "Regular Fuel" system applies equally for the "Premium Fuel" system.

Said first main flow conduit 12 and said second main flow conduit 12′ can be tied together to provide various other combinations of dispensing and blending apparatus in accordance with the invention. Thus, for this purpose there is provided a normally closed valve 51 in said first main flow conduit 12. A one-way check valve 52 is disposed in main flow conduit 12 downstream of said valve 51. A first tie-in conduit 53 is connected at one end to said first main flow conduit 12 upstream of said valve 51 and at its other end to said second main flow conduit 12′ downstream of valve 51′. A normally closed valve 54 is disposed in said tie-in conduit 53. A one-way check valve 56 is disposed in said tie-in conduit 53 downstream from said valve 54. A selector valve 57 is operatively connected to each of said valves 51 and 54 and provides means for biasing said valves to open position, either singly or simultaneously. Said valves 51 and 54 can be any conventional type normally closed valves. As here illustrated they are pneumatically operated motor valves such as Clayton Hytrol Valves, Model 100, described in Bulletin B-100-R8 of the Cla-Val Company. Said selector valve is preferably a manually operated remote valve which is provided with a plurality of ports by means of which instrument air from conduit 58 can be admitted to the motor of either valve 51 or valve 54 singly or to the motors of both valves simultaneously for opening same. When it is desired to close one or both of said valves, the selector valve is turned to a port which will cause the air pressure from the valve motor or motors to be vented through conduit 59.

A second tie-in conduit 61 is connected at one end to said second main flow conduit 12' upstream of valve 51' and at its other end to said first main flow conduit 12 downstream from said valve 51. Valve 54', check valve 56', and selector valve 57' serve the same purpose in connection with tie-in conduit 61 as do like components, valve 54, check valve 56, and selector valve 57 in connection with tie-in conduit 53.

Said tie-in conduits 53 and 61 thus provide means for dispensing the same grades of fuel through both conduits 12 and 12'. For example, by switching selector valve 57 so that both valve 54 and valve 51 are open, nad switching selector valve 57' so that both valves 51' and 54' are closed, regular fuel from pump 10 can be dispensed through the downstream portion of both conduits 12 and 12'. Similarly, by switching selector valve 57 so that both valves 51 and 54 are closed, and switching selector valve 57' so that both valves 51' and 54' are open, premium grade fuel can be dispensed through the downstream portion of both conduits 12 and 12'.

When the same grade of fuel is being dispensed through both conduits 12 and 12' the blend liquid or additive can be injected from additive storage 21 into conduit 12 by means of pump 23 and its associated conduits, and into conduit 12' by means of pump 36 and its associated conduits. Or, the blend liquid or additive can be supplied from additive storage 21' into main conduit 12' by means of pump 23' and its associated conduits, and into main conduit 12 by means of pump 36' and its associated conduits. If it is desired to provide each pump supplying additive to each of the main conduits 12 and 12' with an independent supply of additive, then additive can be injected into conduit 12 by means of pump 23 and into conduit 12' by means of pump 23'.

One embodiment of pump calibrating gauge 26 is illustrated in more detail in FIGURE 2. Said gauge comprises a first or lower plate 62 which is provided with an opening in the center thereof and a second or upper spaced apart plate 63, also provided with an opening in the center thereof. A first annular gasket 64 and a second annular gasket 65 are disposed adjacent said first plate 64 and said second plate 63 respectively around said openings therein. As here shown, said gaskets are mounted on said plates. Obviously, said gaskets could be mounted in suitable recesses in the faces of said plates. A calibrated transparent cylinder 66 is disposed between said gaskets 64 and 65 and the ends of said cylinder enclose said openings in said plates. Said cylinder can be made of any suitable transparent material, such as glass, Plexiglas, etc. It is not necessary that said cylinder be made of a material which is completely transparent such as glass. The only requirement is that the material from which said cylinder is made transmits sufficient light to enable one to read the level of liquid therein. Thus, herein and in the claims, unless otherwise specified, the word "transparent" is used generically to include all such degrees of transparency.

A plurality of adjustable rods 67, preferably four in number, extend through said plates 62 and 63 and are provided for the purpose of bringing said plates and gaskets into sealing engagement with the ends of said cylinder by means of the adjusting nuts shown. A nipple 68 is attached to said lower plate 62 in communication with the opening therein and provides means for connecting a conduit 27 thereto. A second nipple 69 is attached to upper plate 63 in communication with the opening therein and provides means for connecting a vent conduit 71 thereto.

Calibration gauge 26 can be of any suitable size depending upon the blending and dispensing system it is to be employed in. For example, in one system similar to that of FIGURE 1 where such a gauge was installed, and in which the dispensing rate through conduit 13 was maintained at 500 gallons per minute, it was found that a cylinder 66 made of 3-inch I.D. Pyrex pipe and 36 inches in length was satisfactory. The remainder of the elements of gauge 26 are proportioned accordingly.

While the invention has been described with particular reference to blending liquids with liquids, said liquids being liquids at ambient temperatures and pressures, the invention is not so limited. It is within the scope of the invention for one or both of the materials being blended to have a vapor pressure at ordinary temperatures such that superatmospheric pressure must be employed to maintain said material or materials in liquid phase. In such instances cylinder 66 can be reduced in diameter and increased in length to extend the pressure range over which Pyrex glass is suitable.

When the vapor pressure of the additive exceeds the safe operating pressure of Pyrex glass tubing of practical diameters, a metal cylinder provided with a calibrated gage glass as illustrated in FIGURE 3 can be employed. Said metal cylinder 72 can be of any suitable metal and is provided with gage cocks 73. Calibrated gage glass tube 74 having an internal diameter of about one-half inch extends between said gage cocks. If desired, high pressure Jerguson gages can be employed instead of tube 74 to extend the pressure range over which the invention can be practiced. It is also within the scope of the invention to employ radiation means to detect and measure the change of liquid level in cylinder 72.

The above-described blending and dispensing apparatus can be employed for loading mobile transports, such as truck transports, railroad tank cars, etc. Said apparatus can also be employed for blending and dispensing liquids or other fluids into a pipeline for delivery. Thus, as used herein and in the claims, unless otherwise specified, the term "dispensing conduit" is employed generically and includes dispensing spouts such as a loading hose or other means conventionally used to load truck transports and tank cars and also includes any suitable conduit for connecting the above-described apparatus into a pipeline.

In the operation of the apparatus illustrated in FIGURE 1, pump calibration gauges 26 and 26' can be employed in a number of ways to calibrate the additive pumps 23, 36, 23', and 36'. When first starting up a system with an uncalibrated pump, in one presently preferred method the additive pump, pump 23 for example, is started up manually taking suction from additive storage 21 and allowed to discharge at atmospheric pressure into a calibrated container through a bleeder line (not shown) connected into the discharge conduit of said pump. Measurement of the volume pumped for a given period of time will give an approximate calibration of the pump. The final adjustment to the predetermined desired pumping rate is made in the following manner while said pump is pumping against normal loading back pressure. Assuming all operations to be on hand control, valve 19 and the valve 30 in conduit 22 are first opened to admit additive from storage 21 to the suction of pump 23. Valve 28, and either valve 33 or valve 41, are then opened to permit calibration gauge 26 to fill by gravity from said storage 21. Although not so shown in the drawing, it will be understood that additive storage tanks 21 and 21' are mounted at a higher elevation than calibration gauges 26 and 26'. Valve 33 is opened when the additive is normally liquid and gauge 26 vents to the atmosphere. When the additive is under pressure in tank 21, valve 41 is opened to equalize the pressure between gauge 26 and tank 21 to permit gauge 26 to fill. Valve 19 is then closed. Meter 43 is then set to close set stop valve 44 after 1,000 gallons of blend have been dispensed. Valve 25 is opened, and pump 10 and pump 23 are then started up simultaneously. When meter 43 shuts down and closes set stop valve 44, pumps 10 and 23 are stopped. A reading of the calibrated cylinder in gauge 26 will then give the amount of additive pumped per 1,000 gallons of blend. Pump 23 is then adjusted to correct its pumping rate and the above steps repeated until said pump is pumping at the desired rate. A person skilled in the art and familiar with these operations can usually adjust the pump in one or two such trials.

After the additive pump has been initially calibrated in the above or any other suitable manner, subsequent dispensing operations can be carried out on manual control by presetting meter 43 for the desired quantity to be dispensed and then starting and stopping pumps 10 and 23 as described. If desired, the dispensing operations can be made substantially automatic by connecting meter 43 to motor 38 on pump 23 through suitable connections in the starter box of motor 38, and also connecting said meter 43 to the motor on pump 10 by similar connections, not shown. Thus, movement of a suitable lever to place meter 43 in operating condition will automatically start pump 23 and pump 10. Thereafter pump 23 will deliver the desired amount of additive per 1,000 gallons of fuel dispensed so long as meter 23 is running. When said meter 23 reaches the predetermined quantity it is desired to load, it will automatically close valve 44, break the circuit to the motors of pumps 23 and 10, and the loading or dispensing operation is completed. If desired, only motor 29 of pump 23 can be so connected to meter 43. Similar connections can also be made between motor 38 of pump 36 and meter 43'. It is within the scope of the invention to employ any suitable type of automatic control system.

Regardless of whether the loading or dispensing operation is controlled manually or substantially automatically, the additive can be preferably injected throughout the said loading operation and continuously blended with the fuel for optimum mixing and blending of the blend components. If desired, the additive pumps can be suitably controlled to inject the desired amount of additive throughout a controlled period of time by employing suitable timing devices.

The invention finds its greatest value in the accuracy with which small quantities of one liquid can be blended into large quantities of another liquid. It has been found that pump calibrations made by measuring the discharge rate of the additive pump while it is pumping against atmospheric pressure are frequently in error by as much as 25 percent or more when the pump is subsequently operated against a back pressure as in normal loading operations. In contrast to this, when operating in accordance with the invention and calibrating the additive pump by measuring its suction rate during normal loading or dispensing operations, it has been found that the error in pump discharge rate is easily maintained at less than plus or minus two percent, usually less than plus or minus one percent. An outstanding advantage of the invention is the ease and readiness with which the calibration of the additive pump can be checked during an actual loading operation. This not only insures on-specification product but also results in important economic advantages in savings of additive. The calibration of the additive pump can be checked at any time by opening valve 28 to permit gauge 26 to fill, then closing valve 19 to isolate additive storage 21, and observing meter 43 and gauge 26 while pump 23 is in operation. For example, if additive is being blended into the fuel at the rate of 1,000 ccs. per 1,000 gallons of fuel, the meter 43 is read at the instant valve 19, is closed and again at the instant when 1,000 ccs. of additive have been pumped from gauge 26. Valve 19 is then opened and valve 28 is closed. If an adjustment in the pumping rate is necessary, it is made and the calibration of the pump again checked as described above. The above system has been used to continuously blend literally dozens of deliveries in commercial operations. All of the blends were satisfactory in every respect.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. In fuel dispensing apparatus, the combination comprising:
 a first pump means connected to a source of fuel supply;
 a main fuel flow conduit connected at one end to the discharge of said first pump means and at the other end to a dispensing conduit;
 an additive storage tank;
 an additive conduit connected at one end to said additive storage tank and at its other end to said main flow conduit;
 a first valve disposed in said additive conduit downstream from said additive storage tank;
 an additive pump disposed in said additive conduit downstream from said first valve;
 a pump calibration gauge;
 a conduit means connected at one end to said pump calibrating gauge and connected at its other end into said additive conduit intermediate said first valve and said additive pump;
 a sight flow gauge disposed in said additive conduit downstream from said additive pump;
 a set stop meter disposed in said main fuel flow conduit downstream from the point where said additive conduit connects thereto;
 a set stop valve, operatively connected to said set stop meter, disposed in said main fuel flow conduit downstream from said set stop meter;
 and a flow control valve disposed in said main fuel conduit downstream from said set stop valve.

2. In liquid dispensing apparatus, the combination comprising:
 a first pump means connected to a source of liquid supply;
 a main flow conduit connected to the discharge of said first pump;
 a plurality of secondary flow conduits, one end of each connected to said main flow conduit and the other end of each connected to a dispensing conduit;
 a source of blend liquid supply;
 a main blend liquid conduit connected to said source of blend liquid supply;
 a first valve disposed in said main blend liquid conduit;
 a plurality of secondary blend liquid conduits, each one being connected at one end thereof to said main blend liquid conduit at a point downstream from said first valve and at its other end to one of said secondary flow conduits intermediate the ends thereof;
 a plurality of blending liquid pumps, each one being disposed in one of said secondary blend liquid conduits;
 a plurality of pump calibration gauges;
 a plurality of conduit means, each one being connected at one end thereof to one of said pump calibration gauges and at its other end to said main blend liquid conduit downstream from said first valve and upstream from said secondary blend liquid conduits; and a second valve disposed in each of said conduit means.

3. In liquid dispensing apparatus, the combination comprising:
- a first pump means connected to a source of first liquid supply;
- a second pump means connected to a source of second liquid supply;
- a first and a second main flow conduit connected to the discharge of said first and second pump means respectively;
- a first normally closed valve in said first main flow conduit;
- a second normally closed valve in said second main flow conduit;
- a first tie-in conduit connected at one end to said first main flow conduit upstream of said first valve and at its other end to said second main flow conduit downstream from said second valve;
- a third normally closed valve in said first tie-in conduit;
- first biasing means operatively connected to each of said first and third valves for biasing same to open position singly and simultaneously;
- a second tie-in conduit connected at one end to said second main flow conduit upstream of said second valve and at its other end to said first main flow conduit downstream from said first valve;
- a fourth normally closed valve in said second tie-in conduit;
- second biasing means operatively connected to each of said second and fourth valves for biasing same to open position singly and simultaneously;
- a first additive storage tank;
- a first additive conduit connected at one end to said first additive storage tank and at its other end to said first main flow conduit downstream from the point of connection of said second tie-in conduit to said first main flow conduit;
- a fifth valve disposed in said first additive conduit downstream from said first additive storage tank;
- a first additive pump disposed in said first additive conduit downstream from said fifth valve;
- a first pump calibration gauge;
- a first conduit means connected at one end to said first pump calibrating gauge and connected at its other end into said first additive conduit intermediate said fifth valve and said first additive pump;
- a sixth valve disposed in said first conduit means;
- a second additive storage tank;
- a second additive conduit connected at one end to said second additive storage tank and at its other end to said second main flow conduit downstream from the point of connection of said first tie-in conduit to said second main flow conduit;
- a seventh valve disposed in said second additive conduit downstream from said second additive storage tank;
- a second additive pump disposed in said second additive conduit downstream from said seventh valve;
- a second pump calibration gauge;
- a second conduit means connected at one end to said second pump calibrating gauge and connected at its other end into said second additive conduit intermediate said seventh valve and said second additive pump;
- and an eighth valve disposed in said second conduit means.

4. In liquid dispensing apparatus, the combination comprising:
- a first pump means connected to a source of first liquid supply;
- a second pump means connected to a source of second liquid supply;
- a first and a second main flow conduit connected to the discharge of said first and second pump means respectively;
- a first normally closed valve in said first main flow conduit;
- a second normally closed valve in said second main flow conduit;
- a first tie-in conduit connected at one end to said first main flow conduit upstream of said first valve and at its other end to said second main flow conduit downstream from said second valve;
- a third normally closed valve in said first tie-in conduit;
- first biasing means operatively connected to each of said first and third valves for biasing same to open position singly and simultaneously;
- a second tie-in conduit connected at one end to said second main flow conduit upstream of said second valve and at its other end to said first main flow conduit downstream from said first valve;
- a fourth normally closed valve in said second tie-in conduit;
- second biasing means operatively connected to each of said second and fourth valves for biasing same to open position singly and simultaneously;
- a first additive storage tank;
- a first additive header conduit connected to said first additive storage tank;
- a fifth valve disposed in said first additive header conduit;
- a first secondary additive conduit connected at one end thereof to said first additive header conduit downstream from said fifth valve and at its other end to said first main flow conduit downstream from the point of connection of said second tie-in conduit to said first main flow conduit;
- a first additive pump disposed in said first secondary additive conduit;
- a first pump calibration gauge connected, by means of a valved conduit, into said first additive header conduit downstream from said fifth valve and upstream from said first secondary additive conduit;
- a second secondary additive conduit connected at one end thereof to said first additive header conduit downstream from said fifth valve and said first secondary additive conduit and at its other end to said second main flow conduit downstream from the point of connection of said first tie-in conduit to said second main flow conduit;
- a second additive pump disposed in said second secondary additive conduit;
- a second additive storage tank;
- a second additive header conduit connected to said second additive storage tank;
- a sixth valve disposed in said second additive header conduit;
- a third secondary additive conduit connected at one end thereof to said second additive header conduit downstream from said sixth valve and at its other end to said second main flow conduit downstream from the point of connection of said first tie-in conduit to said second main flow conduit;
- a third additive pump disposed in said third secondary additive conduit;
- a second pump calibration gauge connected, by means of a valved conduit, into said second additive header conduit downstream from said sixth valve and upstream from said third secondary additive conduit;
- and a fourth additive secondary conduit connected at one end thereof to said second additive header conduit downstream from said sixth valve and said third secondary additive conduit and at its other end to said first main flow conduit downstream from the point of connection of said second tie-in conduit to said first main flow conduit.

References Cited by the Examiner
UNITED STATES PATENTS

| | | | |
|---|---|---|---|
| 1,515,746 | 11/24 | Norman | 73—3 |
| 1,964,028 | 6/34 | Boynton et al. | 222—135 X |
| 2,062,173 | 11/36 | Haskins | 73—168 |
| 2,084,548 | 6/37 | Bennett | 222—145 X |
| 2,612,777 | 10/52 | Greer | 73—168 |
| 2,826,067 | 3/58 | Braunlich | 73—168 |
| 2,846,119 | 8/58 | Robbins | 222—20 |
| 2,872,072 | 2/59 | Reed | 222—145 X |
| 2,898,002 | 8/59 | Blanchet et al. | 222—145 X |
| 2,898,005 | 8/59 | Rotter | 222—135 |
| 3,098,382 | 7/63 | Hoffman et al. | 73—3 |

LOUIS J. DEMBO, *Primary Examiner.*

EVERETT W. KIRBY, *Examiner.*